United States Patent
Sajayan et al.

(10) Patent No.: US 8,683,134 B2
(45) Date of Patent: Mar. 25, 2014

(54) UPGRADE OF LOW PRIORITY PREFETCH REQUESTS TO HIGH PRIORITY REAL REQUESTS IN SHARED MEMORY CONTROLLER

(75) Inventors: Sajish Sajayan, C.V. Raman Nagar (IN); Alok Anand, Bangalore (IN); Ashish Rai Shrivastava, Sugar Land, TX (US); Joseph R. Zbiciak, Arlington, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1054 days.

(21) Appl. No.: 12/356,308

(22) Filed: Jan. 20, 2009

(65) Prior Publication Data

US 2009/0248992 A1    Oct. 1, 2009

Related U.S. Application Data

(60) Provisional application No. 61/022,008, filed on Jan. 18, 2008.

(51) Int. Cl.
*G06F 13/00* (2006.01)
*G06F 13/28* (2006.01)

(52) U.S. Cl.
USPC .......... 711/137; 711/158; 711/E21.057; 710/6; 710/40

(58) Field of Classification Search
USPC ............ 711/137, 158, E12.058; 710/6, 40
See application file for complete search history.

(56) References Cited

U.S. PATENT DOCUMENTS 6,058,461 A * 5/2000 Lewchuk et al. ........... 711/158
2009/0049256 A1 * 2/2009 Hughes et al. .............. 711/158

* cited by examiner

*Primary Examiner* — Edward Dudek, Jr.
(74) *Attorney, Agent, or Firm* — Robert D. Marshall; W. James Brady; Frederick J. Telecky, Jr.

(57) ABSTRACT

A prefetch controller implements an upgrade when a real read access request hits the same memory bank and memory address as a previous prefetch request. In response per-memory bank logic promotes the priority of the prefetch request to that of a read request. If the prefetch request is still waiting to win arbitration, this upgrade in priority increases the likelihood of gaining access generally reducing the latency. If the prefetch request had already gained access through arbitration, the upgrade has no effect. This thus generally reduces the latency in completion of a high priority real request when a low priority speculative prefetch was made to the same address.

2 Claims, 2 Drawing Sheets

UPGRADE OF LOW PRIORITY PREFETCH REQUESTS TO HIGH PRIORITY REAL REQUESTS IN SHARED MEMORY CONTROLLER

CLAIM OF PRIORITY

This application claims priority under 35 U.S.C. 119(e)(1) to U.S. Provisional Application No. 61/022,008 filed Jan. 18, 2008.

TECHNICAL FIELD OF THE INVENTION

The technical field of this invention is power controlling shared memories in a multiprocessor system.

BACKGROUND OF THE INVENTION

This invention is applicable to a shared memory controller in a multiprocessor system. The multiprocessor system is divided into per-CPU and per-memory bank logic blocks. Each per-CPU logic contains prefetch buffers with one entry corresponding to each bank of memory that can be accessed. The prefetch buffers are filled speculatively based on the last access made by the CPU. On an access from the master matching the address of an entry in the prefetch buffer known as a hit, the prefetched data is supplied to the CPU. On an access from the master having an address within a memory bank of prefetched data but not the address of the prefetched data, the contents of that entry are invalidated and a prefetch request issued from the per-CPU logic to the per-bank logic. Prefetch requests in the per-bank logic compete with real read accesses, write accesses and prefetch requests from other per-CPU logic. A prefetch request has the lowest priority. Thus a prefetch request may take a long time to complete. While the prefetch request is waiting in the per-bank logic for service, the master of the per-CPU logic that initiated the prefetch request may issue a real request to the same bank.

If the real request is to the same address as the prefetch request, there are 2 possible options. The real request can be ignored. In this alternative, the data returned by the prefetch request is sent to the requesting master. Since the prefetch request has the lowest priority, the prefetch access may take longer than if the new real request had been sent to the per-bank logic. The second alternative terminates the prefetch request and sends the new real request to the per-memory bank logic. This does not take advantage of the case where the prefetch request is complete and the data in available. The new real access request will incur additional delay going through arbitration again.

SUMMARY OF THE INVENTION

This invention operates when a real read access request hits the same memory bank and memory address as a previous prefetch request. When this occurs the per-CPU logic sends a signal to the per-memory bank logic to upgrade the priority of the prefetch request. In response to this signal the per-memory bank logic promotes the priority of the prefetch request to that of a read request. If the prefetch request is still waiting to win arbitration, this upgrade in priority increases the likelihood of gaining access generally reducing the latency. This avoids latency due to the low priority of a prefetch request. If the prefetch request had already gained access through arbitration, the upgrade has no effect.

This thus generally reduces the latency in completion of a high priority real request when a low priority speculative prefetch was made to the same address.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
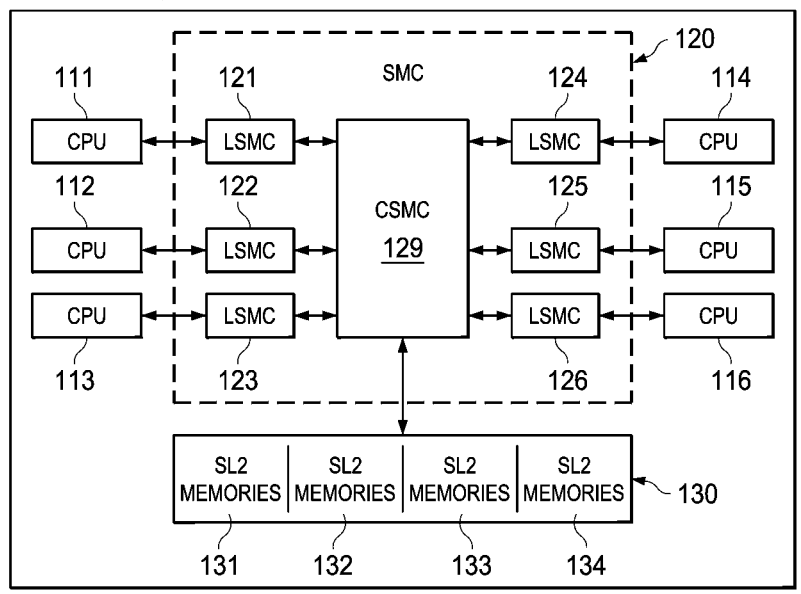
FIG. 1 is a block diagram of a multiprocessor system integrated circuit using shared memory.

This invention is useful in a multiprocessor integrated circuit such as illustrated in FIG. 1. Example multiprocessor integrated circuit 100 includes: six central processing units 111, 112, 113, 114, 115 and 116; a shared memory controller 120 including six local shared memory controllers 121, 122, 123, 124, 125 and 126 connected to corresponding central processing units and central shared memory controller 129; and shared memory 130 including separately energizable memory banks 131, 132, 133 and 134. Multiprocessor integrated circuit 100 includes plural central processing units sharing a common memory. Note the number of central processing units and memory banks shown in FIG. 1 is exemplary only. This architecture creates problems solved by this invention.

Each of the central processing units 111 to 116 is a stand-alone programmable data processor. In the preferred embodiment these have the same instruction set architecture (ISA). This is known as homogenous multiprocessing. However, this invention is also applicable to heterogeneous multiprocessing in which the central processing units employ two or more ISAs. Each central processor preferably includes a processing core for data processing operations, a data register file for temporary storage of operand data and results data and instruction and data cache. Each central processing unit operates under its own program. Each central processing unit uses shared memory controller 120 to access programs and data in shared memory 130.

Shared memory controller (SMC) 120 interfaces central processing units 111, 112, 113, 114, 115 and 116 to shared memory 130. In the preferred embodiment shared memory 130 is at the same level in the memory hierarchy as second level (L2) cache in central processing units 111, 112, 113, 114, 115 and 116. SMC 120 includes: Local SMC (LSMC) and Central SMC (CSMC). This partition is done to keep the GEM specific logic in the LSMC and the memory bank specific logic in the CSMC.

Figure 2:
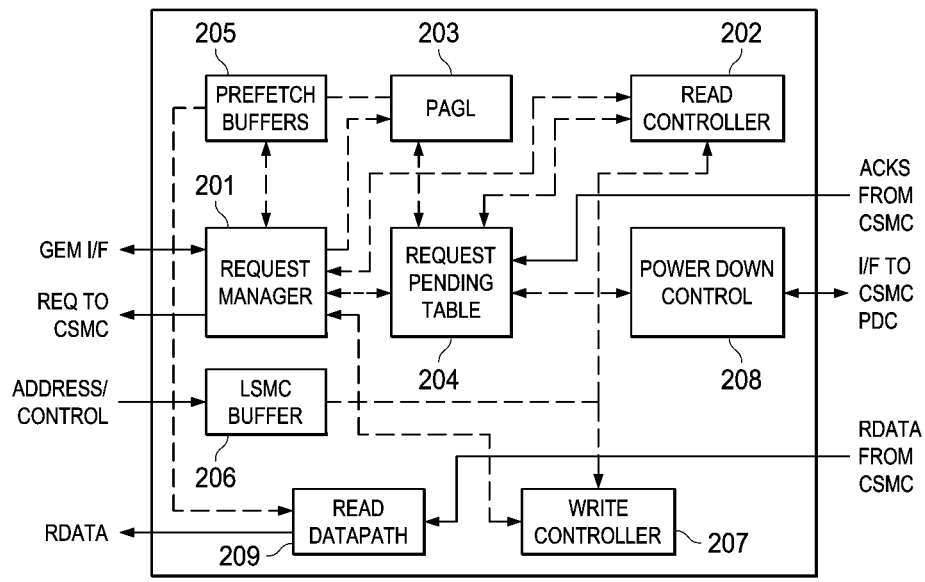
FIG. 2 is a block diagram of the local shared memory controller corresponding to one of the processors of the multiprocessor system.
Figure 3:
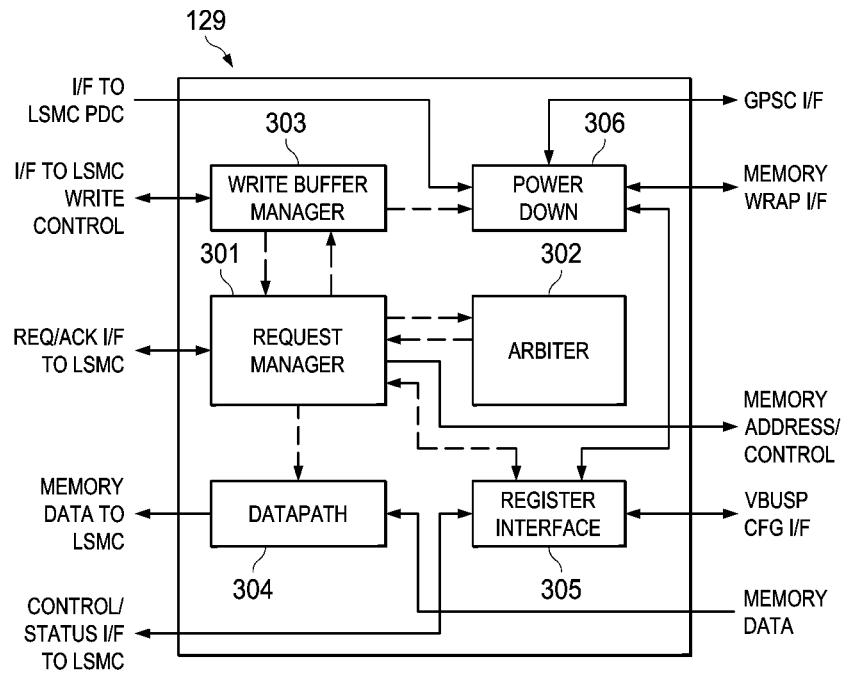
FIG. 3 is a block diagram of the central shared memory controller of the multiprocessor system.

FIG. 2 illustrates an exemplary local shared memory controller 121. LSMC 121 includes: request manager 201; read controller 202; prefetch access generation logic (PAGL) 203; request pending table 204; prefetch buffers 205; LSMC buffer 206; write controller 207; power down controller 208; and read datapath 209.

Request manager 201 interfaces with the corresponding CPU interface. Request manager 201 decodes the requests from CPU 111 and controls the different blocks with in LSMC 121. Request manager 201 handles the lookup of the prefetch buffers and figures out if a CPU 111 access hits or misses the prefetch buffers. Request manager 201 generates a system ready signal taking individual components of ready from read controller 202 and write controller 209. Request manager 210 controls read datapath 209 to CPU 111. Request manager 121 submits the read requests and prefetch requests to CSMC 129.

Read controller 202 manages all the read requests that go to memory banks 131, 132, 133 and 134. Read controller 202 contains per bank state machines that submit read requests to CSMC 129. Read controller 202 contains logic to stall CPU 111 using the cready signal.

Prefetch access generation logic 203 generates the prefetch requests to CSMC 129 to fill prefetch buffers 205. PAGL 203 calculates the addresses to be prefetched based on the type of access by CPU 111. Request manager 201 controls PAGL 203 when killing or aborting a prefetch request.

Request pending table 204 maintains the status of access requests and prefetch requests. Request pending table 204 splits incoming acknowledge signals from CSMC 129 for requests sent from LSMC 121 into real access and prefetch acknowledgments. Real access acknowledgments are routed to CPU 111 and read controller 202. Prefetch acknowledgments are routed to prefetch buffers 205. Request pending table 204 includes a number of entries direct mapping the number of logical memory banks 131, 132, 133 and 134.

Prefetch buffers 205 include data buffers with each logical memory bank 131, 132, 133 and 134. Thus the preferred embodiment includes four data buffers. Prefetch buffers 205 store prefetched data and address tags. Whenever a stored address tag matches the address of an access on the CPU interface and the prefetch data is valid, this data is directly forwarded from prefetch buffers 205 to CPU 111 without fetching from memory.

LSMC buffer 206 is a per-CPU command register which buffers the address and control signals on every access from the CPU. In the case of a write access, LSMC buffer 206 also buffers the write data.

Write controller 207 handles write requests from CPU 111. Writes use a token-based protocol. CSMC 129 has 4 per-bank write buffers. Writes from all CPUs arbitrate for a write token to write into the per-bank write buffers. Write controller 207 handles the token request interface with CSMC 129.

Power down controller 208 communicates with its counterpart in CSMC 129. Whenever the CSMC 129 power down controller requests a sleep or wakeup, power down controller 208 ensures that LSMC 121 is in a clean state before allowing the CSMC 129 power down controller to proceed.

Read datapath 209 receives control signals from request manager 201 corresponding to the type of access. Read datapath 209 multiplexes data from either prefetch buffer 205 or the memory data from CSMC 129 which is registered and forwarded to CPU 111.

Central shared memory controller (CSMC) 129 includes: request manager 301; arbiter 302; write buffer manager 303; datapath 304; register interface 305; and power down controller 306.

Request manager 301 receives requests from all CPUs 111 to 116. Request manager 301 submits these requests to a corresponding per-bank arbiter. Request manager 310 generates the memory control signals based on the signals from the CPU which won the arbitration. Request manager 301 contains the atomic access monitors which manage atomic operations initiated by a CPU.

Arbiter 302 is a least recently used (LRU) based arbiter. Arbiter 302 arbitrates among requests from all six CPUs for each memory bank 131, 132, 133 and 134. Arbitration uses the following priority. Write requests have the highest priority. Only one write request will be pending to any particular bank at a time. Real read requests have the next lower priority. A real read request is selected only if there are no pending write requests from any CPU. Prefetch requests have the lowest priority. Prefetch requests are selected only if there are no write requests or real read requests from any CPU.

Among CPUs requesting access at the same priority level, arbiter 302 implements a standard LRU scheme. Arbiter 302 has a 6 bit queue with one entry per CPU in each queue. The head of the queue is always the LRU. If the requester is the LRU, then it automatically wins the arbitration. If the requester is not the LRU, then the next in the queue is checked and so on. The winner of a current arbitration is pushed to the end of the queue becoming the most recently used. All other queue entries are pushed up accordingly.

Write buffer manager 303 contains per-bank write buffers. Write buffer manager 303 interfaces with the token requests from a write controller 207 of one of the LSMCs 121 to 126. Token arbitration uses a LRU scheme. Each per-bank write buffer of write buffer manager includes six finite state machines, one for each CPU. These finite state machines control generation of token requests to arbiter 302. Write buffer manager 303 registers and forwards the token grant from arbiter 302 to the corresponding CPU. Upon receiving the token grant the CPU has control of the per-bank write buffer and proceeds with the write.

Datapath 304 multiplexes between data from different memory pages and forwards data to the LSMC of the CPU which won the arbitration.

Register interface 305 supports a VBUSP interface through which software can program several registers. These registers control the operation of shared memory controller 120. Signals are exported from the register interface to different blocks in LSMCs 121, 122, 123, 124, 125 and 126 and CSMC 129.

Power down controller 306 interfaces with the programmable registers through which software can request a sleep mode or wakeup of memory banks 131, 132, 133 and 134. Power down controller 306 interfaces with the power down controller 208 of each LSMC 121, 122, 123, 124, 125 and 126, and memory wrappers to put the memory banks 131, 132, 1332 and 134 into sleep mode and wakeup.

Figure 4:
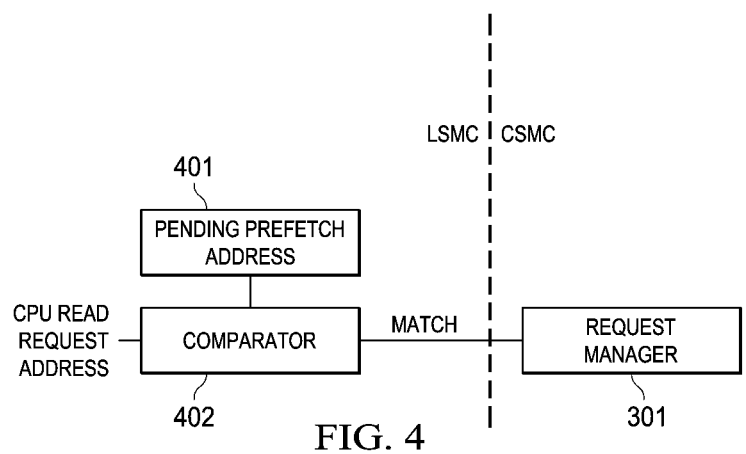
FIG. 4 is a block diagram of the power controller portion of the this invention.

FIG. 4 illustrates in block diagram form the circuits of an implementation of this invention. In FIG. 4 circuits to the left of the dashed line are in a corresponding LSMC. Circuits to the right of the dashed line are in CSMC 129. Pending prefetch address register 401 stores the access address of a pending prefetch. Comparator 402 compares this pending prefetch address with the address of a CPU read access request. Comparator 402 generates a match signal if the addresses are identical. This match signal signals request manager 301 of CSMC 129 to upgrade the prefetch request for the corresponding memory bank to a read request. As noted above read requests have higher priority in arbitration than prefetch requests. This upgrade thus typically decreases the time to win arbitration and be granted access.

This is advantageous over the two techniques of the prior art. Ignoring real request results in delay because the prefetch has a lower priority than the read request. Terminating the prefetch request and issuing a new real request to the per-memory bank logic does not take advantage of any progress already made by the prefetch request. Upgrading the prefetch request as in this invention reduces the delay for arbitration grant and takes advantage of any progress of the prefetch.

What is claimed is:

1. A prefetch control system in a shared memory multiprocessor system having a plurality of processors and a shared memory with a plurality of independently addressable memory banks comprising:
- a plurality of pending prefetch address registers, one pending prefetch address register for each processor of said multiprocessor system storing an address of a pending prefetch of a corresponding processor;
- a plurality of comparators, one comparator for each processor of said multiprocessor system connected to said pending prefetch address register of the corresponding processor and receiving a read request address of a read request by the corresponding processor, each of said comparators generating a match signal if said pending prefetch address and said read request address of the corresponding processor are identical; and
- a plurality of request managers, one request manager for each independently addressable memory bank within the shared memory connected to each comparator and submitting memory access requests directed to a corresponding independently addressable memory bank having a first priority for read requests and a second lower priority for prefetch requests, said request manager upgrading said pending prefetch request of the corresponding processor from said second priority to said first priority upon receipt of said match signal.

2. A method of prefetch control in a shared memory multiprocessor system having a plurality of processors and a shared memory with a plurality of independently addressable memory banks comprising the steps of:
- storing an address of a pending prefetch for each processor of said multiprocessor system in a separate pending prefetch address register corresponding to the processor;
- comparing said stored pending prefetch address and a read request address of a read request by the corresponding processor in a separate comparator corresponding to the processor and generating a match signal if said pending prefetch address and said read request address for the same processor are identical; and
- upgrading said pending prefetch request at a corresponding one of the plurality of independently addressable memory banks of the corresponding processor from a first priority to a second higher priority upon receipt of said match signal.

* * * * *